US008862671B2

(12) United States Patent
Chu

(10) Patent No.: US 8,862,671 B2
(45) Date of Patent: Oct. 14, 2014

(54) AGGREGATE COMMUNICATIONS WITH INTELLIGENT SOURCING

(75) Inventor: Lon-Chan Chu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1038 days.

(21) Appl. No.: 11/957,133

(22) Filed: Dec. 14, 2007

(65) Prior Publication Data
US 2009/0157824 A1 Jun. 18, 2009

(51) Int. Cl.
G06F 15/16 (2006.01)
G06Q 10/10 (2012.01)

(52) U.S. Cl.
CPC .................................. *G06Q 10/107* (2013.01)
USPC ........................................................ 709/206

(58) Field of Classification Search
USPC .......................................... 709/226, 204, 206
See application file for complete search history.

(56) References Cited

U.S. PATENT DOCUMENTS

| 6,591,291 | B1 | 7/2003 | Gabber et al. |
| 6,871,215 | B2 | 3/2005 | Smith et al. |
| 7,020,687 | B2 | 3/2006 | Mooney et al. |
| 7,043,001 | B2 | 5/2006 | Moisey et al. |
| 7,188,144 | B2 | 3/2007 | Fuisz |
| 7,333,796 | B2 | 2/2008 | Scalisi et al. |
| 2002/0174185 | A1 | 11/2002 | Rawat et al. |
| 2003/0157968 | A1* | 8/2003 | Boman et al. ................ 455/563 |
| 2004/0162773 | A1* | 8/2004 | Del Rey et al. ............... 705/36 |
| 2004/0181580 | A1* | 9/2004 | Baranshamaje ............. 709/206 |
| 2004/0254996 | A1 | 12/2004 | Yabe et al. |
| 2005/0027779 | A1* | 2/2005 | Schinner ...................... 709/200 |

(Continued)

OTHER PUBLICATIONS

Unknown, "Multiple Identity Support," available at http://www.mozilla.org/projects/thunderbird/identities.html, printed on Nov. 18, 2007, 2 pages.

(Continued)

*Primary Examiner* — Asad Nawaz
*Assistant Examiner* — Syed S Ali
(74) *Attorney, Agent, or Firm* — John Jardine; Kate Drakos; Micky Minhas

(57) ABSTRACT

Selecting a source account for an outgoing communication content of a user is described. A collection of source accounts is associated with the user. Each source account has an individual content storage storing communication content associated with the corresponding source account. A user's authentication is validated for using the collection of source accounts. One source account in the collection is designated as a primary source account. The source accounts in the collection are aggregated to a primary content storage. The user is authenticated to sign in to the primary source account. Instructions are received from the user for generating a communication content from the primary source account and the primary content storage. Instructions are received from the user for selecting one of the source accounts in the collection as the source account for the generated communication content, and the user is signed in to the primary source account.

14 Claims, 8 Drawing Sheets

(56) References Cited

U.S. PATENT DOCUMENTS

| | | |
|---|---|---|
| 2005/0204011 A1 | 9/2005 | Velayudham |
| 2005/0246419 A1 | 11/2005 | Jaatinen |
| 2006/0010213 A1* | 1/2006 | Mehta ............................ 709/206 |
| 2006/0031340 A1* | 2/2006 | Mathew et al. ................ 709/206 |
| 2006/0168040 A1* | 7/2006 | Kushmerick et al. ......... 709/206 |
| 2007/0061400 A1* | 3/2007 | Parsons ......................... 709/206 |
| 2007/0124400 A1* | 5/2007 | Lee ................................ 709/206 |
| 2007/0299918 A1* | 12/2007 | Roberts ......................... 709/206 |
| 2008/0172459 A1* | 7/2008 | Cross et al. ................... 709/204 |
| 2008/0261569 A1* | 10/2008 | Britt et al. .................. 455/414.1 |
| 2009/0089380 A1* | 4/2009 | Wang et al. .................... 709/206 |
| 2009/0138562 A1* | 5/2009 | Schmulen et al. ............. 709/206 |
| 2009/0154674 A1 | 6/2009 | Chu |
| 2011/0040840 A1* | 2/2011 | Addante et al. ................ 709/206 |
| 2013/0332551 A1* | 12/2013 | Hardy et al. ................... 709/206 |

OTHER PUBLICATIONS

Tschabitscher, Heinz, "How to Create Multiple Email Identities in Pegasus Mail," available at http://email.about.com/od/pegasusmailtips/qt/et082304.htm, printed on Nov. 18, 2007, 1 page.

Unknown, "Web Enabled Email Redirect Service [WEERS] Architecture," available at http://home.att.net/~s-prasad/rdm_wp.pdf, 1999-2000, 8 pages, Redirect Mail.Com, Inc.

Unknown, "Managing Email Aliases," available at http://www.active-venture.com/support/cp/aliases.htm#understand, printed on Nov. 18, 2007, 3 pages.

\* cited by examiner

AGGREGATE COMMUNICATIONS WITH INTELLIGENT SOURCING

BACKGROUND

The advent of the Internet changes the way people communicate with one another. Electronic mail (e-mail), instant messaging, web logs (blogs), online chat rooms, and the like create new ways of communication for online users. Even the traditional telephone services cannot escape this information wave when voice over internet protocol (VOIP) technology emerges.

For e-mail communication, an e-mail account is associated with an e-mail address, and the e-mail address is an identification that identifies the e-mail account. A service provider provides the e-mail account to a user, and the user may access the e-mail account online via a web interface through a browser or the user may access the e-mail account via a client communication application installed on the user's local device. When the user sends an e-mail message, the e-mail address is pre-configured as the sender or source ID for the e-mail message. In the same way, a phone which includes mobile phone, landline phone, VoIP softphone, and VoIP phone device, or the like is associated with a caller identification (ID). When a user makes a phone call, the caller ID is pre-configured as the sender ID or source ID.

However, a user may wish to have different personas and may have one or more e-mail addresses or phone numbers. For example, it is very common for an individual who frequently uses the Internet to have a work e-mail address, a personal e-mail address, and so on. Similarly, the same individual may have a cellular telephone number, a work telephone number, and a home phone number.

Currently, in order for the user to send messages using the proper e-mail address as the source ID of the message, the user typically needs to log in to the e-mail account and compose the e-mail messages. Alternatively, the user may use a client application that is configured to include each e-mail account's login information (e.g., username, password, mail server information, and the like) and is able to receive e-mail messages for all accounts. However, currently, the user is unable to login or sign in to one account and compose a message having another e-mail address as the messages source ID.

SUMMARY

Embodiments of the invention overcome the shortfalls of previous technologies by enabling the user to select his/her e-mail address or telephone number as a source ID for an outgoing telephone call or an outgoing e-mail message. In addition, aspects of the invention designate one of the e-mail accounts or one of the telephone numbers as a primary source ID for receiving all messages or all telephone calls. Furthermore, when the user responds to any message within this primary source ID account, embodiments of the invention will persist the original intended source ID, instead of the primary source ID if the original intended source ID is different from the primary source ID, as the source ID when the user responds to the message. Alternatively, aspects of the invention may enable user override authority for modifying the source ID when responding messages or may analyze characteristics of any given message and produce a history for automatically suggesting a source ID to the user.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
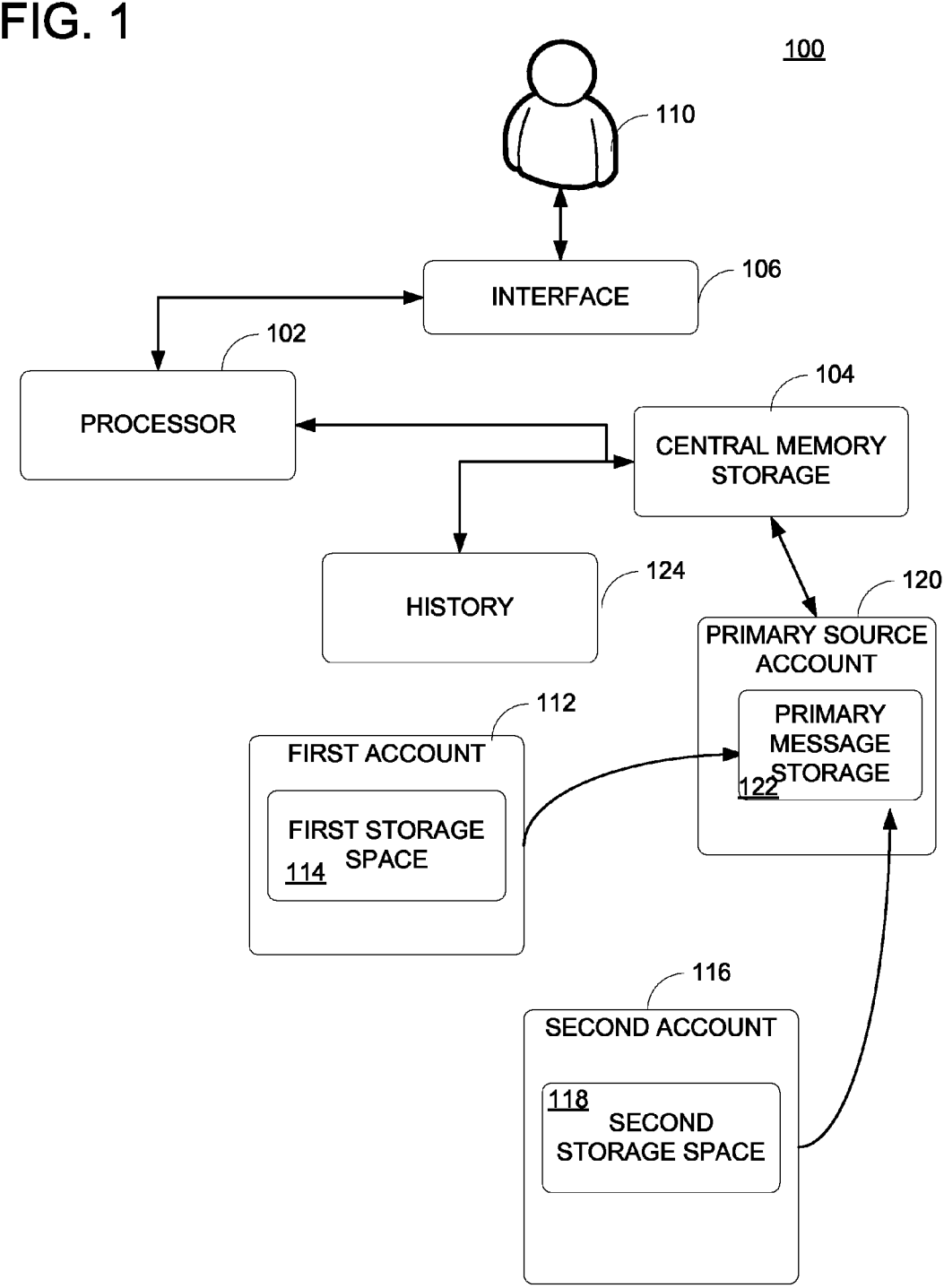
FIG. 1 is an exemplary embodiment of a system for selecting a source account for an outgoing message from a user according to an embodiment of the invention.

Referring now to FIG. 1, a block diagram illustrates an exemplary system 100 for selecting a source ID for an outgoing message for a user according to an embodiment of the invention. The system 100 includes a processor 102, a central memory storage 104 and an interface 106. The process 102 may be a processing unit, a processor, a microprocessor, a collection of processing units, processors, and/or microprocessors. In one embodiment, the system 100 may be a computer, a computer server, a collection of computer servers, or part of an enterprise having one or more computers. The central memory storage 104 may include computer-readable medium or computer-readable media accessible by the processor 102 for storing data. In one alternative embodiment, a database or other computing storage units may be used without departing from the scope and/or the spirit of the invention. The interface 106 may be a user interface (UI), a graphical UI (GUI), a network interface, a system bus, or other types of input/output interface for the system 100 or the processor 102.

Figure 2:
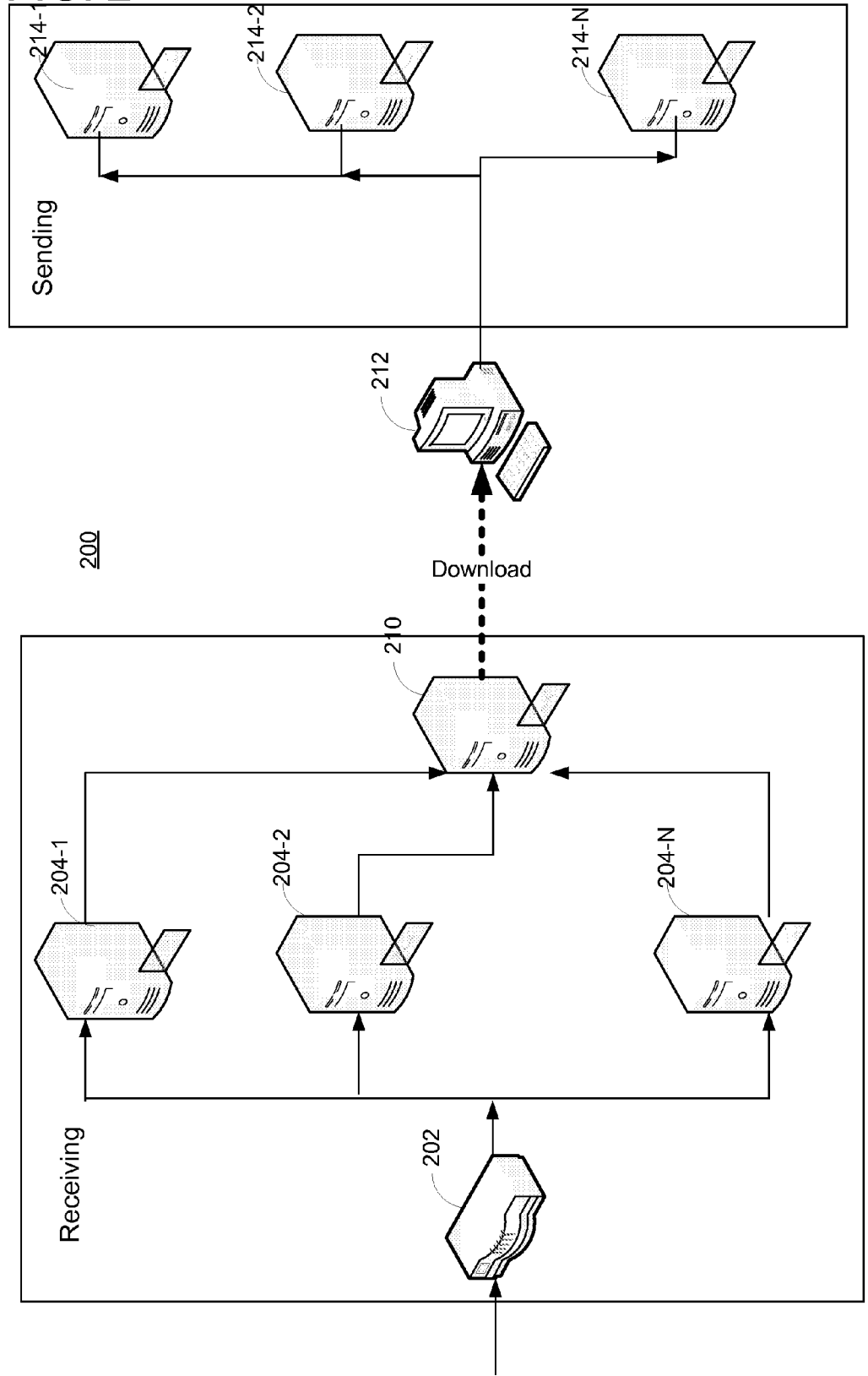
FIG. 2 is an exemplary block diagram illustrating an exemplary system for selecting an e-mail address for an outgoing message according to an embodiment of the invention.

In one embodiment, the system 100 may be a mail server for handling e-mail messages, e-mail accounts, or the like. For example, referring to FIG. 2, an exemplary implementation of aspects of the invention in an e-mail server system 200. In one embodiment, a plurality of e-mail accounts 204 belongs to a user 110. For example, the user 110 may have a personal e-mail address 204-1, a work e-mail address 204-2, and a family e-mail address 204-N. It is to be understood that the user 110 may have other e-mail addresses for other purposes. A router 202 attempts to route e-mail messages to the user's e-mail addresses 204. Aspects of the invention, on the receiving of e-mail messages, enable designating one of the e-mail addresses 204 as a primary source account 210.

On the other hand, embodiments of the invention also enable the users for selecting a source account for an outgoing message. For example, embodiments of the invention enable a local device 212 of the user 110 for selecting one of the source accounts 214 as a source account for sending messages. To further illustrate these embodiments, referring now to FIG. 1, suppose the user 110 has established two accounts, a first account 112, and a second account 116. For simplicity, these accounts are e-mail accounts. It is to be understood that these accounts may be telephone accounts, as will be illustrated below, and other types of communication accounts.

Initially, the user 110 associates the first account 112 and the second account 116 with the user 110. For example, the user may have a user identification associated with an online service. In one example, the user identification may be an e-mail address, such as the first account. Once the user 110 associates the first account 112 and the second account 116 with the user 110, system 100 validates or determines whether the user 110 has the proper rights or authorization to use these accounts. For example, the system 100 require verification by checking the username and password pair for the accounts and requesting and verifying security information, such as personal details, security questions "What is the name of the street of your high school?", or the like. Once the system 100 has properly verified the user 110, the user 110 may designate one of the accounts as a primary source account or an aggregate account 120.

In another example, a user 110 may aggregate multiple accounts into a single account, where the user can send and receive from this primary source account 120. The primary source account 120 may be any one of the group of multiple accounts to aggregate. The user 110 selects one from the group of accounts as the primary source account 120.

In this example, to send an outbound e-mail, the user 110 can select the sender e-mail address from a set of pre-configured e-mail addresses (e.g., the first account 112 or the second account 116) from the primary source account. For an outbound e-mail, the user 110 can select from a set of pre-configured e-mail addresses and use it as the sender or source e-mail address (showing up in the "From" field, so the recipient(s) can reply back to the sender). The pre-configuration is done by tying a set of e-mail addresses, where the user must have the necessary credentials in order to use these e-mail addresses. The user cannot simply enter any e-mail address as he/she wishes. The user must be authenticated to use these e-mail addresses.

For instance, John Doe has three accounts: personal-john@a.com (personal account), soho-john@b.com (small business account), and fantasy-john@c.com (private account). Assume John Doe prefers to use personal e-mail account to manage all these accounts. As such, John designates personal-john@a.com as the primary source account. When John sends an outbound e-mail from within, he can select the e-mail address from either personal account, small business account, or private account. The recipient will only see the selected account as the sender.

In one embodiment, the first account 112 has a first storage space 114 associated therewith for storing messages directed to the first account 112 as the destination account. Similarly, the second account 116 has a second storage space 118 associated therewith for storing messages directed to the second account 116 as the destination account.

On the other hand, when receiving an inbound e-mail, the system 100 will move the mail messages from its original destination inbox (e.g., the first storage space 114 or the second storage space 118) to the aggregate inbox (e.g., primary message storage 122). When the user wants to reply this e-mail back to the sender, the e-mail client device (e.g., a local computer or a web browser) may select by default the (original recipient) e-mail address on the To field of the original e-mail. Where there are multiple e-mail addresses on the "To" field, the system 100 may choose one that is associated with the primary source account. Nevertheless, the user is enabled to overwrite the system 100 by changing the e-mail address or the source account.

In one alternative embodiment, the system 100 enables anonymous e-mailing, where the "anonymity" is achieved by replacing the regular account identification with a tentative ID that is valid for an extended period of time, say 1-6 months.

Figure 3:
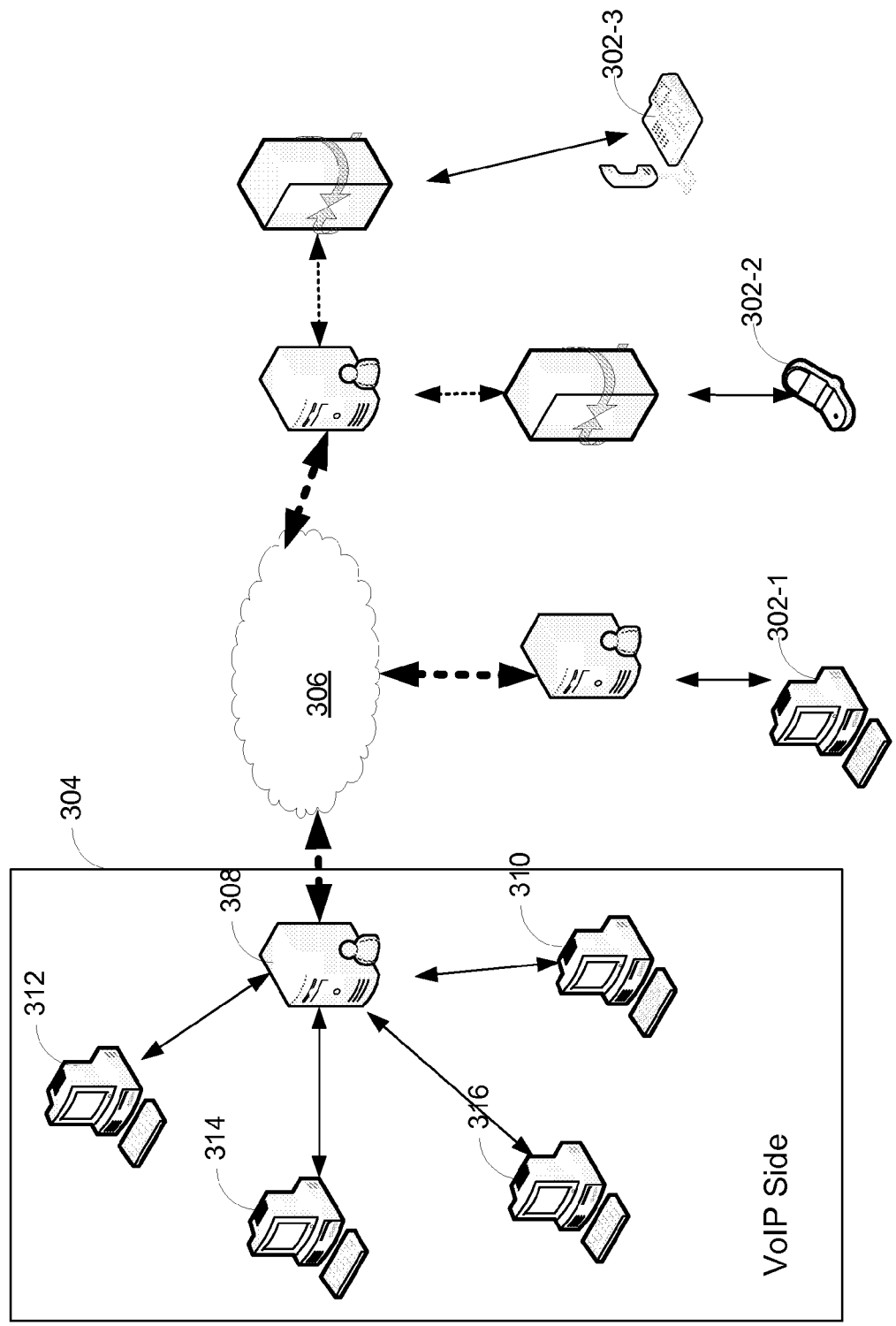
FIG. 3 is an exemplary block diagram illustrating an exemplary system for selecting a telephone number for an outgoing call according to an embodiment of the invention.

In another embodiment, the system 100 may be implemented for enabling the user 110 to select a telephone number as a source account for an outgoing call, as illustrated in FIG. 3. For example, FIG. 3 illustrates one or more telephone accounts 302, such as VOIP phone 302-1, a cellular or mobile phone 302-2, and a landline phone 302-3 (e.g., home phone or work phone). Also, a set of VOIP phones 304 may be part of the accounts associated with the user 110. A communication network 306 connects these accounts and/or devices together, such as via the Internet.

In terms of telephone accounts, a caller ID is a unique identifier for the telephone that identifies the account. Therefore, each account 302 or 304 has a source account associated therewith. In other words, a user's account 110 may be associated with multiple phone numbers, such as, but not limited to, work phone, home phone, and mobile phone. In account aggregation, phone numbers may have a duplicate and any duplicates will be removed. The user may select as caller ID any phone number from this set of unique phone numbers. The primary source account therefore has multiple caller IDs as well. It is also to be understood that proper verification or authentication is needed for verifying that the user 110 has the permission or authority to use the accounts 302.

In one embodiment, to make an outbound phone call, the user 110 may select the caller ID from a set of pre-configured phone numbers in the primary source account 120. By so doing, when the call is made, the caller ID shows up in the callee's display of caller ID, so the callee can call back to the caller.

For an inbound call, the system 100 may route the call to the appropriate endpoint (e.g., accounts 302), including but not limited to mobile phone, landline phone, VoIP softphone, and VoIP phone device, based on callee's call routing rules. From the caller's perspective, the caller is not aware that the call is routed to another endpoint.

In an alternative embodiment, aspects of the invention may also enable anonymous calling, where the "anonymity" is achieved by replacing the normal caller ID with a tentative caller ID that is valid for an extended period of time, say 1-6 months.

In an alternative embodiment, when calls are made from an VoIP account, aspects of the invention process at least the following routines:

1. When SIP Proxy A 308 receives a VoIP call, it will determine if the destination softphone, say softphone N 310, is online or not.

2. If the destination softphone of the callee is online, SIP Proxy A 308 routes the call to the destination softphone (i.e., softphone N 310).

3. If the destination softphone is not online, SIP Proxy A 308 routes the call to the aggregation softphone A 312 of the callee.

4. If neither of the above softphones is online, SIP Proxy A 308 may route the call to any online softphone endpoint (e.g., softphone_1 314 and softphone_2 316) for this callee.

5. Regardless of which softphone answering the call, the call history will remember the triplet <Caller's Caller ID, Callee's Caller ID, and Receiving Softphone's Caller ID>.

Alternative, when sending VoIP Calls:

1. When the user wants to make a new call, the system can find out which softphone was to receive any call from this callee based on the triplets in the call history (e.g., history 124), also to be discussed further below.

2. If no softphone is found, the system 100 may automatically put the caller ID of the aggregate softphone as the caller ID of this new call.

3. If a single softphone is identified, the system 100 may automatically put the caller ID of this softphone as the caller ID for this new call.

4. The system 100 uses the identified caller ID as the caller ID for the new call.

Figure 4:
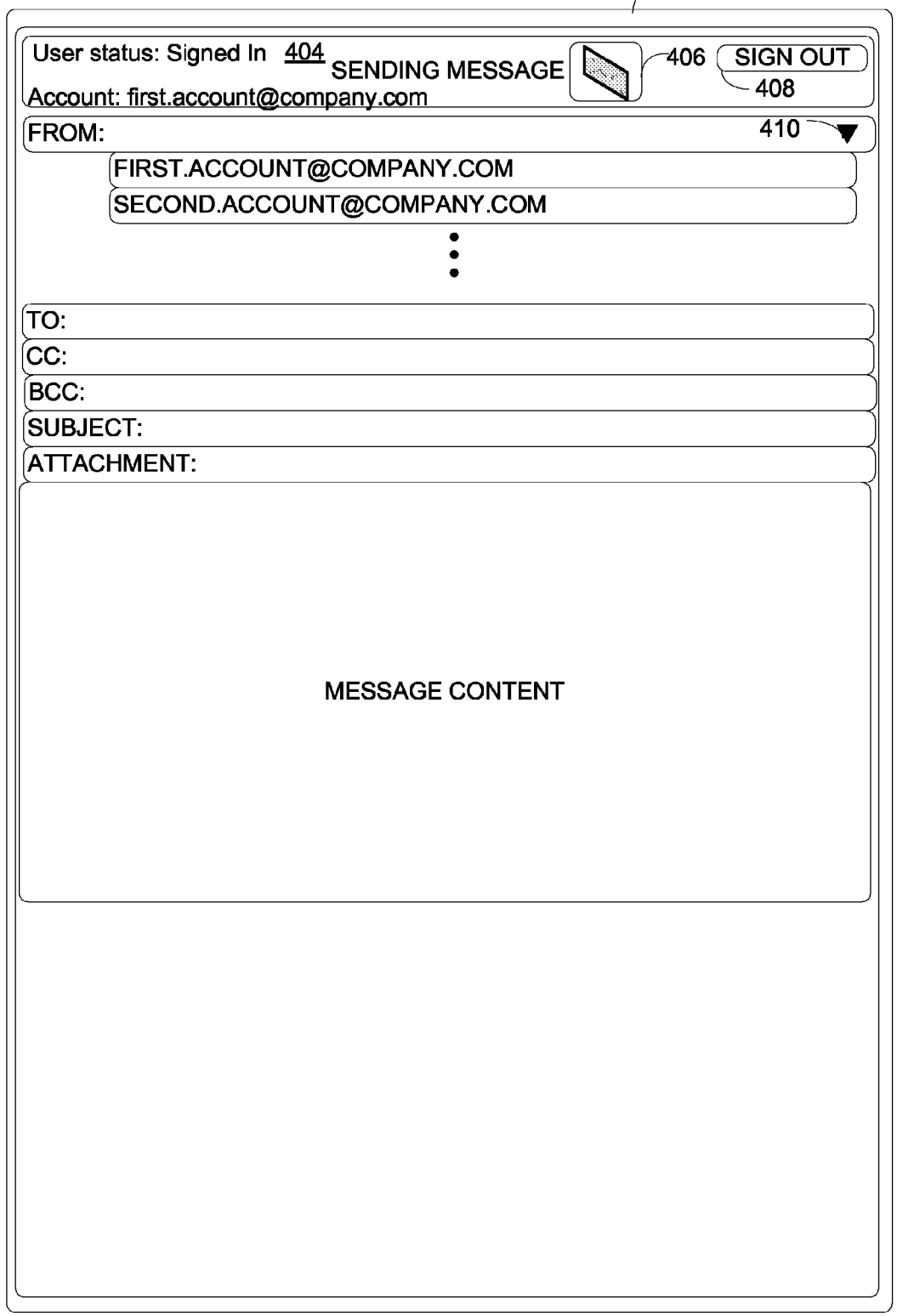
FIGS. 4-7 are exemplary screen displays for illustrating a user interface for selecting a source account for an outgoing message according to an embodiment of the invention.

Referring now to FIGS. 4-7, exemplary screen shots illustrate aspects of the invention for selecting a source account for an outgoing or outbound message from a user according to an embodiment of the invention. Referring to FIG. 4, a window 402 illustrates an e-mail message composition screen. A status bar 404 illustrates an account status of the primary source account or aggregate account 120 of the user 110. For example, the status bar 404 illustrates that the user is "Signed In" and includes a Send Message control or button 406 for sending an e-mail message. The status bar 404 also includes a Sign Out control or button 408 for enabling the user 110 to sign out of the primary source account 120. In one embodiment, the status bar 404 also shows the information of the primary source account 120.

In order to send an message, the user 110 may select one or more source accounts associated with the user 110 by selecting a drop-down control 410 in the "FROM" field. Upon activating such the drop-down control 410, aspects of the invention provide a list of associated accounts. In this example, the first account 112 and the second account 116 are listed. In other words, the user 110 may now select one of the source accounts associated with user 110 when the user 110 is signed in to one particular account.

Figure 5:
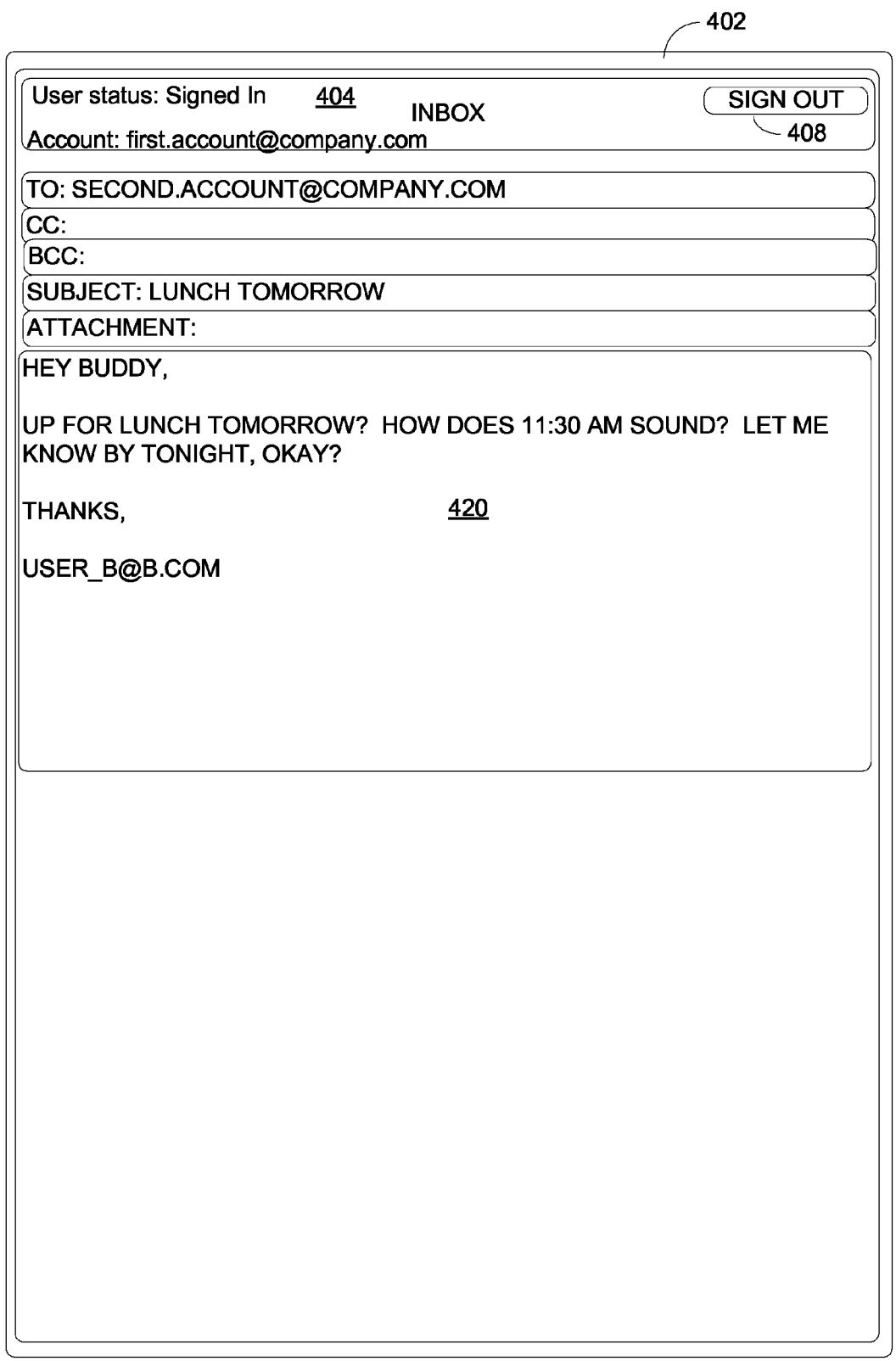

FIG. 5 illustrates a simplistic screen display showing a message 420 received from USER_B@B.COM. In addition, the message 420 is intended to be delivered to one of the source accounts that the user 110 has: second.account@company.com (i.e., the second account 116). Because the user 110 has designated the first account 112 as the primary source account 120, all messages directed to other accounts associated with the user 110 will be delivered to the primary source account 120.

Figure 6:
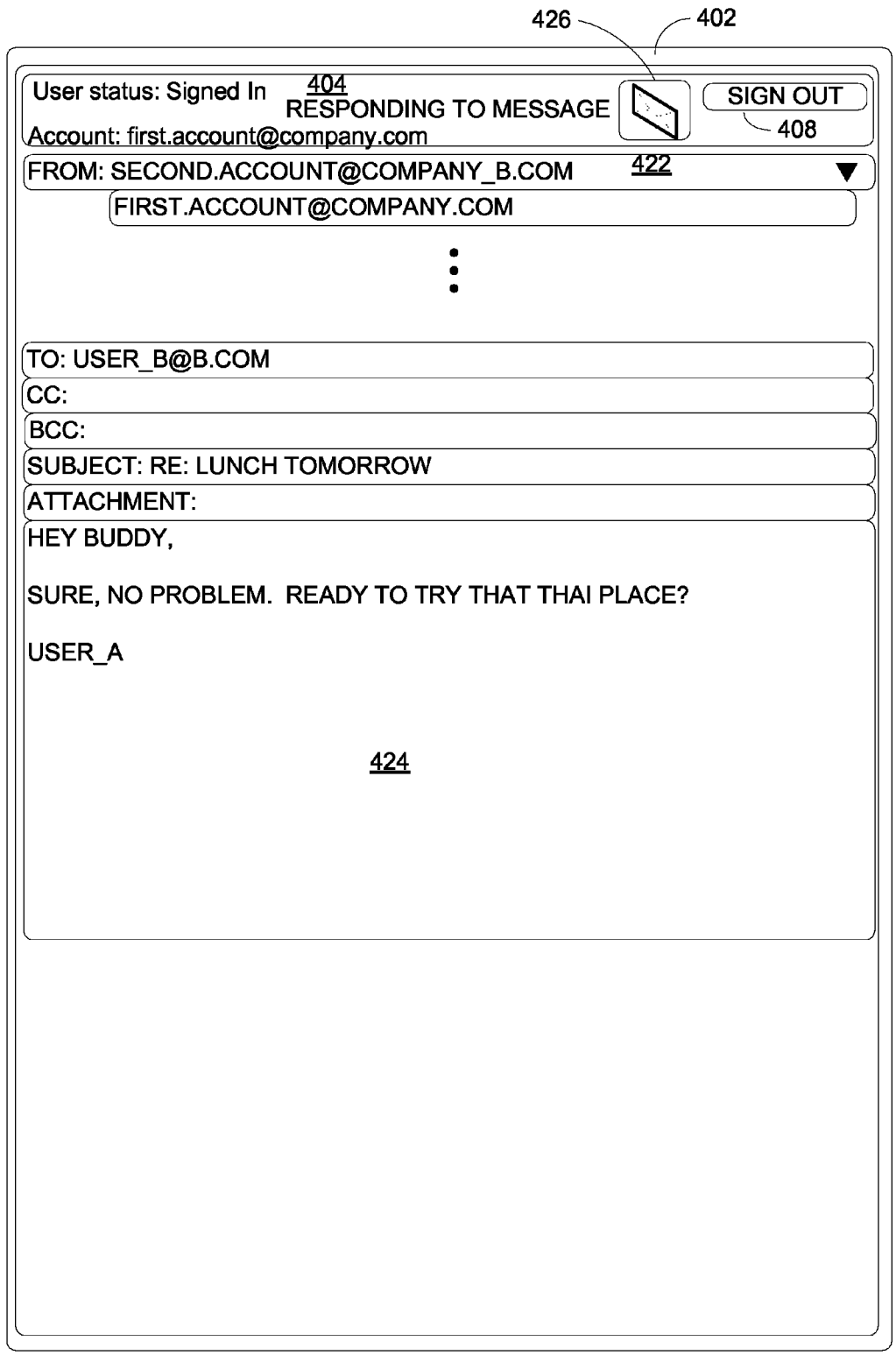

In FIG. 6, when the user 110 wishes to respond to the message 420, a "FROM" field 422 of a response message 424 now indicates "second.account@company.com." In other words, aspects of the invention persist or maintain the original destination account when the user 110 wishes to respond (e.g., by pressing a "RESPOND" button or control 426) to the sender. By doing this, aspects of the invention beneficially maintain the proper continuity for both the user 110 and the intended recipient because the user 110 and the recipient can easily recognize the e-mail messages between each other. Unlike previous implementations where an account is designated as a primary account, the primary account will replace the originally intended destination when the user wishes to respond to the message. This may cause confusion on the recipient or this may unintentionally reveal to the recipient from the sender that the sender actually has different accounts that the recipient is not aware of.

Figure 7:
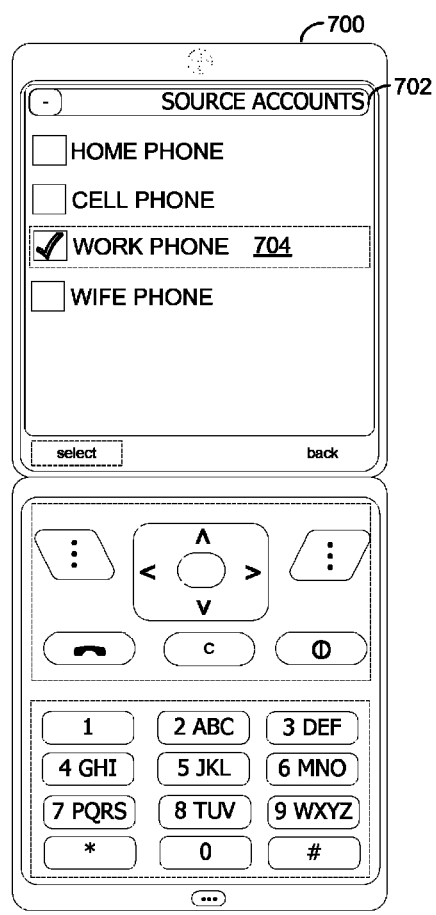

FIG. 7 illustrates another UI implementation when using on a telephone device 700. For example, FIG. 7 illustrates an exemplary telephone interface with one menu section "SOURCE ACCOUNTS" 702 for enabling the user 110 to select one of the source accounts associated therewith. In one embodiment, the user 110 selects a work phone as a primary source account 120 or a source account for the call at 704.

Figure 8:
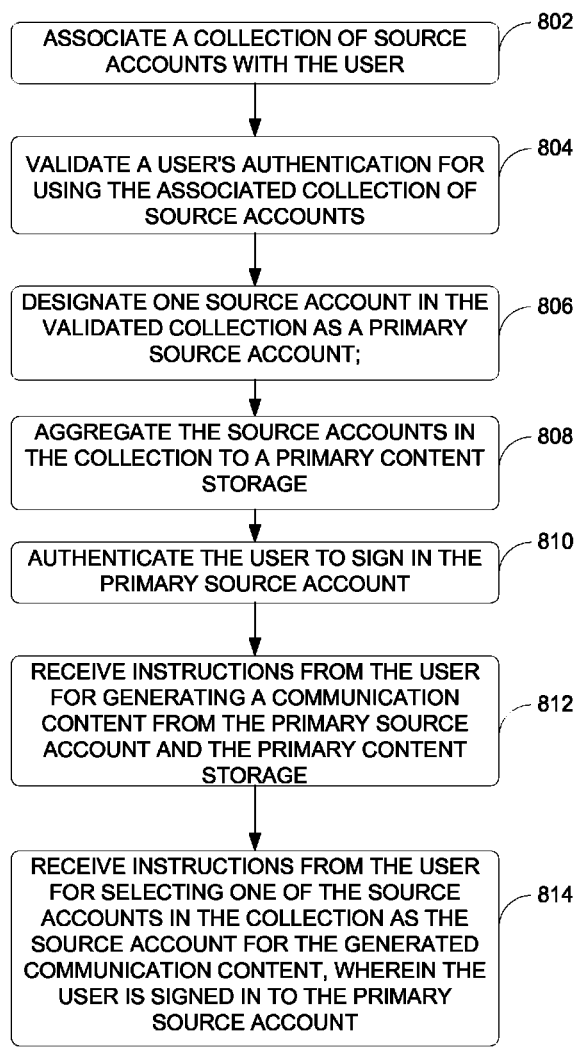
FIG. 8 is an exemplary flow chart illustrating operation of selecting a source account for an outgoing message for a user according to an embodiment of the invention.

FIG. 8 is an exemplary flow chart illustrating operation of selecting a source account for an outgoing message for a user according to an embodiment of the invention. At 802, a collection of source accounts is associated with the user. Each of said source accounts has an individual content storage for storing communication content associated with the corresponding source accounts. At 804, a user's authentication for using the associated collection of source accounts is validated. For example, the user 110 may need to verify a number of information to indicate that the user 110 has the rights or permissions to the use the collection of source accounts. One source account in the validated collection is designated as a primary source account at 806. At 808, the source accounts are aggregated to a primary content storage. The primary content storage is associated with the primary source account. The user is authenticated to sign in the primary source account at 810. At 812, a communication content (e.g., a message or a call) is generated from the primary source account and the primary content storage. For example, the user 110 provide instructions (e.g., through input device indications) for generating a message directed to a recipient. AT 814, one of the source accounts in the collection is selected as the source account for the generated communication content while the user is signed in to the primary source account.

In one embodiment, the user may overwrite or cancel this selection option by always designating the primary source account as the only source account for messages. In another embodiment, when responding to a message previously received by one of the source accounts, aspects of the invention maintain or persist the original intended account as the source account (i.e., the "FROM" field). Alternative embodiments may enable the user to overwrite this automatic selection of the original intended account as the source account. A further embodiment of the invention may analyze each of the messages based on characteristics such as the first account, the second account, and one or more destination accounts for the stored messages. Another embodiment of the invention may establish a history to identify relationships based on the analysis of the characteristics. For example, suppose the user 110 frequently sends messages or makes phone calls to USER_C using the second account 118 or the cell phone 302-2, the system 100 may establish this history information and automatically configure the generating a message or a communication content for the USER_C or responding to a message from the USER_C based on the analyzed characteristics. In another embodiment, the system 100 may suggest a source account based on the history or the analyzed characteristics.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for selecting a source account for an outgoing communication content of a user, said method comprising:
   associating a collection of independent source accounts with the user, each of said source accounts having an individual content storage, said individual content storage storing communication content associated with the corresponding source accounts;
   validating a user's authentication for using each source account of the associated collection of source accounts;
   receiving, from the user, a selection of one source account of the validated, associated source accounts as a primary source account;
   aggregating the source accounts in the collection to a primary content storage, said primary content storage being associated with the primary source account;
   authenticating the user to sign in to the primary source account;
   receiving instructions from the user for generating a communication content from the selected primary source account and the primary content storage;
   receiving instructions from the user for selecting one of the source accounts in the collection as the source account for the generated communication content, wherein the user is signed in to the primary source account, said selected source account different from the primary source account;
   analyzing the communication content stored in the primary content storage;
   establishing a history for identifying relationships in at least one of the following: the source accounts in the collection and one or more destination accounts for the stored communication content;
   suggesting a source account for the outgoing message based on the established history and
   sending the generated message from the primary source account with the selected source account as the sender source account.

2. The method of claim 1, wherein associating comprises associating the collection of source accounts with the user, said source accounts including at least one or more of the following: a telephone number and an electronic mail (e-mail) address.

3. The method of claim 1, wherein aggregating comprises forwarding communication content directed to the source accounts in the collection to the primary source account.

4. The method of claim 1, wherein receiving instructions from the user for generating the communication content comprises receiving instructions from the user for performing at least one of the following: sending a new communication content and responding to a previous communication content already stored in the primary content storage.

5. The method of claim 1, wherein designating comprises designating the one source account in the validated collection as the primary source account for receiving communication content intended for source accounts other than the primary account.

6. A method for persisting one source account among a plurality of aggregated accounts for an outgoing message of a user, said method comprising:
   associating at least a first account and a second account with the user as source accounts, said first account having a first content storage for storing messages delivered to said first account and indicating said first account as a destination account, said second account having a second content storage for storing messages delivered to said second account and indicating said second account as a destination account;
   validating a user's authentication for using each of the associated first account and the second account;
   receiving, from the user, a selection of the validated first account from the validated, associated source accounts as a primary source account;
   aggregating the first content storage and the second content storage to a primary message storage, said primary message storage being associated with the primary source account, said primary message storage storing messages delivered to the first content storage and storing messages delivered to the second content storage;
   authenticating the user to sign in to the primary source account;
   receiving instructions from the user for generating a message from the primary source account and the primary message storage, said generated message responding to one of the messages stored in the primary message storage, said one of the messages being a message delivered to the second account;
   persisting the second account as a sender source account for the generated message, wherein the user is still signed in to the primary source account, wherein the generated message is sent from the primary source account with the validated second account as the sender source account;
   establishing a history for identifying relationships based on analyzed characteristics and in at least one of the following: the source accounts in the collection and one or more destination accounts for the stored communication content; and
   suggesting a source account for the outgoing message based on the established history.

7. The method of claim 6, wherein aggregating comprises forwarding messages directed to the first account and the second account to the primary source account while maintaining the first account and the second account as destination accounts for the corresponding forwarded messages.

8. The method of claim 6, wherein associating comprises associating the collection of source accounts with the user, said source accounts including at least one or more of the following: a telephone number and an electronic mail (e-mail) address.

9. The method of claim 6, wherein designating comprises designating the validated first account as the primary source account for receiving messages intended for the second account.

10. The method of claim 6, further comprising analyzing at least one of the following characteristics of the messages stored in the primary message storage: the first account, the second account, and one or more destination accounts for the stored messages.

11. A system of managing messages for a user, said system comprising:
   an interface for performing at least one of the following operations: receiving messages, transmitting messages, receiving instructions from the user, and transmitting responses to the user in response to the received instructions;
   a central memory storage for storing messages;
   a processor configured to execute computer-executable instructions for:
      associating at least a first account and a second account with the user as source accounts, said first account having a first storage space in the central memory storage with messages delivered to said first account and indicating said first account as a destination account, said second account having a second storage space in the central memory storage with messages delivered to said second account and indicating said second account as a destination account;
      validating a user's authentication for using each of the associated first account and the second account;
      receiving, from the user, a selection of the first account from the validated, associated source accounts as a primary source account;
      aggregating the first storage space and the second storage space to a primary message storage, said primary message storage being associated with the primary source account, said primary message storage storing messages delivered to the first content storage and storing messages delivered to the second content storage;
      authenticating the user to sign in to the primary source account;
      establishing a history for identifying relationships based on analyzed characteristics and in at least one of the following: the first account, the second account, and one or more destination accounts for the stored messages; and
      suggesting a source account for an outgoing message based on the established history;
   wherein the system comprises at least one or more of the following:
   wherein the interface receives instructions from the user for generating and sending a message from the primary source account and the primary message storage with the validated sender account as the sender source account, wherein the interface receives instructions from the user for selecting the second account as the source account for the generated communication content while the user is signed in to the primary source account; and
   wherein the interface receives instructions from the user for generating and sending a second message from the primary source account and the primary message storage with the validated sender account as the sender source account, said generated message responding to one of the messages stored in the primary message storage, said one of the messages being a message delivered to the second account, and wherein the processor persists the second account as a sender source account for the generated message as the user is signed in to the primary source account.

12. The system of claim 11, wherein the first account or the second account comprises at least one or more of the following: a telephone number and an electronic mail (e-mail) address.

13. The system of claim 11, wherein the processor is configured to forward messages directed to the second account to the primary source account.

14. The system of claim 11, wherein the processor is further configured to analyze at least one of the following characteristics of the messages stored in the primary message storage: the first account, the second account, and one or more destination accounts for the stored messages.

* * * * *